United States Patent [19]

Popov et al.

[11] 4,271,367

[45] Jun. 2, 1981

[54] LINEAR INDUCTION MOTOR

[76] Inventors: Alexandr D. Popov, pereulok Rynochny, 44; Vladimir A. Solomin, ulitsa Dachnaya, 14, kv. 31; Sergei S. Khantimirov, pereulok Boevoi, 4; Alexandr A. Shirokov, ulitsa Petrashevskogo, 48, kv. 23, all of Rostov-na-Donu, U.S.S.R.

[21] Appl. No.: 120,041

[22] Filed: Feb. 11, 1980

[51] Int. Cl.$^3$ .......................................... H02K 41/04
[52] U.S. Cl. ..................................................... 310/13
[58] Field of Search .................................. 310/12–14; 318/135

[56] References Cited

U.S. PATENT DOCUMENTS

| 3,585,423 | 6/1971 | Bolton et al. | 310/13 |
|---|---|---|---|
| 3,628,072 | 12/1971 | Nicholson | 310/13 |
| 3,644,762 | 2/1972 | Eastham | 310/13 |
| 3,770,995 | 11/1973 | Eastham et al. | 310/13 |
| 3,836,799 | 9/1974 | Eastham et al. | 310/13 |

FOREIGN PATENT DOCUMENTS 1340860 12/1973 United Kingdom ................ 310/13

*Primary Examiner*—Donovan F. Duggan
*Attorney, Agent, or Firm*—Fleit & Jacobson

[57] ABSTRACT

A linear induction motor comprising an inductor with a magnetic core structure formed of first-group laminations extended in one direction and interconnected by means of second-group laminations extended in another direction transversely of the first direction and with a polyphase concentrated winding and a secondary element having an electrically conductive part arranged on a magnetically conductive base, each first-group lamination being provided with at least four slots and each second-group lamination having an inverted U-shape configuration. Each coil of the polyphase concentrated winding encompasses one of rods of at least one of the first-group laminations and one of rods of at least one of the second-group laminations. Coils in each row extended in the first direction have a forward phase rotation up to the middle of the row and a reverse phase rotation thereafter. Coils in each row extended in the second direction have a forward phase rotation. This invention provides a means for increasing safety of occupants of high-speed ground transport systems and for enhancing operational reliability of such systems.

2 Claims, 2 Drawing Figures

LINEAR INDUCTION MOTOR

FIELD OF THE INVENTION

This invention relates to electrical machines and in particular to linear induction motors.

The linear induction motor forming the subject of the present invention is suitable for use with high-speed ground transport systems wherein occupants travel along an overhead magnetic way at a speed of 350 to 500 km/h. It is also applicable for use in non-ferrous metallurgy within systems transporting rolled non-ferrous sheets and profile stock as well as non-ferrous castings along an overhead magnetic way having any suitable configuration. Provisions are incorporated for varying levitation within desirable limits to preclude physical damage to machined surfaces.

The linear induction motor according to the present invention may find application in conveyer installations, subway transport systems and in various power drives wherein working members perform a rectilinear or reciprocating motion.

DESCRIPTION OF THE PRIOR ART

Known in the art is a linear induction motor disclosed and claimed in British Pat. No. 1,340,860, cl. H2A.

In the aforesaid linear induction motor the magnetic system of an inductor is formed both with a lamination extended in the direction of inductor movement and a lamination extended transversely of the direction of inductor movement, a yoke thereof being supported by the lamination extended in the direction of inductor movement. A polyphase winding is arranged soly on the lamination extended in the direction of inductor movement. A secondary element of the prior art linear induction motor includes an electrically conductive part arranged on a magnetically conductive base.

With this arrangement the inductor is not transversely stabilized with respect to the secondary element.

Also known in the art is a linear induction motor disclosed in "Construction of Linear Induction Motors with Transversely Closed Magnetic Flux" by A. D. Popov and V. A. Solomin, Registration No. 663/78, Central Technical and Economic Research Institute under the Ministry of Communications.

The aforesaid linear induction motor comprises an inductor with a magnetic core structure formed of first- and second-group laminations and with a polyphase concentrated winding having its coils arranged in a plurality of rows and a secondary element having an electrically conductive part arranged on a magnetically conductive base.

With this arrangement the first-group laminations are extended in one direction, transversely of the direction of inductor movement, and interconnected by means of the second-group laminations extended in another direction, transversely of the first direction, i.e., in the direction of inductor movement. Each coil of the polyphase concentrated winding encompasses one of rods of at least one of the first-group laminations and one of rods of at least one of the second-group laminations, the coils in each row extended in the second direction having a forward phase rotation.

The first-group laminations having an inverted U-shape configuration are arranged in two rows, the inverted U-shape laminations in each row being successively disposed in the second direction. One of the second-group laminations is inserted between the rows of the first-group laminations, whereas the other two second-group laminations are outwardly adjacent thereto. In such a linear induction motor the inductor is not transversely stabilized with respect to the secondary element, which impairs to a large extent safety of high-speed ground transport systems.

SUMMARY OF THE INVENTION

It is an object of the present invention to provide a linear induction motor wherein an inductor is transversely stabilized with respect to a secondary element.

The invention resides in the provision of a linear induction motor comprising an inductor with a magnetic core structure formed of first- and second-group laminations and with a polyphase concentrated winding having its coils arranged in a plurality of rows and a secondary element having an electrically conductive part disposed on a magnetically conductive base, the first-group laminations being extended in one direction and interconnected by means of the second-group laminations extended in another direction transversely of the first direction, each coil of the polyphase concentrated winding encompassing one of rods of at least one of the first-group laminations and one of rods of at least one of the second-group laminations, the coils in each row extended in the second direction having a forward phase rotation, according to the invention, each first-group lamination being provided with at least four slots adapted to receive the coils of the polyphase concentrated winding, each second-group lamination having an inverted U-shape configuration, the number of the second-group laminations between each pair of the adjacent first-group laminations exceeding by one piece the number of the slots in the first-group laminations, the coils of the polyphase concentrated winding in each row extended in the first direction having a forward phase rotation up to the middle of the row and a reverse phase rotation thereafter.

Preferably extreme first-group laminations are made to a dimension, as measured in the second direction, which exceeds a similar dimension of each of the other first-group laminations by an amount corresponding to the dimension of the rod of the second-group lamination, as measured in the second direction.

The present invention makes it possible to enhance safety of occupants of a high-speed ground transport system employing a linear induction motor due to transversal stabilization of an inductor with respect to a secondary element and also to increase operational reliability of such a high-speed ground transport system.

DESCRIPTION OF THE DRAWINGS

The invention will now be described in greater detail with reference to a specific embodiment thereof, taken in conjunction with the accompanying drawings, wherein.

DESCRIPTION OF THE INVENTION

Figure 1:
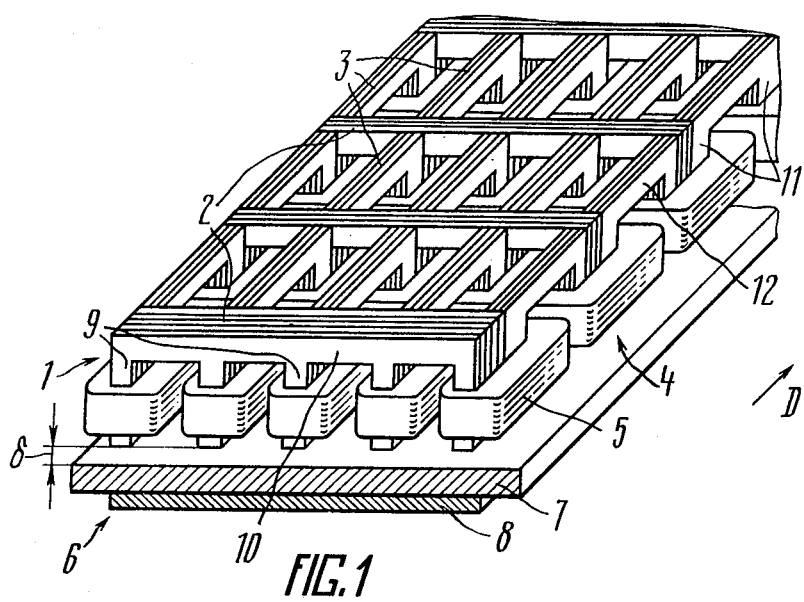
FIG. 1 shows a linear induction motor according to the invention.

The linear induction motor forming the subject of the present invention comprises an inductor 1 (FIG. 1) with a magnetic core structure formed of first-group laminations 2 and second-group laminations 3 and with a polyphase concentrated winding 4 having its coils 5 arranged in a plurality of rows and a secondary element 6 having an electrically conductive part 7 arranged on a magnetically conductive base 8 and separated by a gap $\delta$ from the inductor 1.

In operation the inductor 1 moves in the direction of the arrow D.

The first-group laminations 2 are extended in one direction, transversely of the direction of movement of the inductor 1, and are interconnected by means of the second-group laminations 3 extended in another direction, transversely of the first direction, i.e., in the direction of movement of the inductor 1.

Each first-group lamination 2 is provided with four slots arranged between five rods 9 and interconnected with a yoke 10, said slots being adapted to receive the coils 5. Each second-group lamination 3 has an inverted U-shape configuration and includes two rods 11 and a yoke 12. Five second-group laminations 3 are placed between each pair of the adjacent laminations 2.

Desirably extreme laminations 2 are made to a dimension, as measured in the second direction, which exceeds a similar dimension of each of the other laminations 2 by an amount corresponding to the dimension of the rod 11 of the lamination 3, as measured in the second direction.

With such a construction of the laminations 2 the coils 5 of the polyphase concentrated winding 4 have equal dimensions, which in effect facilitates fabrication of the inductor 1.

Each coil 5 of the polyphase concentrated winding 4 in the extreme rows extended in the first direction encompasses one of the rods 9 of one of the laminations 2 and one of the rods 11 of one of the laminations 3, whereas each coil 5 of the polyphase concentrated winding 4 in the other rows encompasses one of the rods 9 of one of the laminations 2 and the rods 11 of the two laminations 3.

Figure 2:
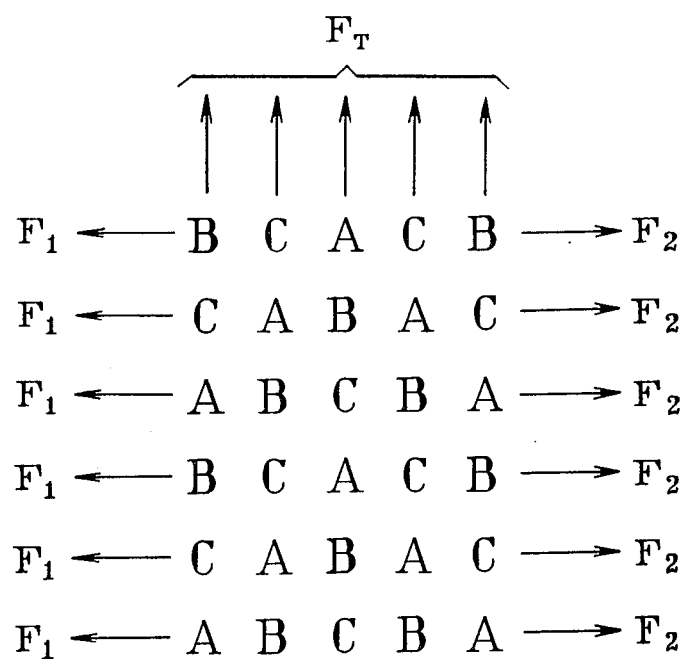
FIG. 2 illustrates phase distribution of a three-phase power supply among coils of the three-phase winding shown in FIG. 1, according to the invention.

Referring now to FIG. 2 there is shown phase distribution of a three-phase power source among the coils of the three-phase concentrated winding. In the drawing the letters A, B and C denote respective phases of the three-phase power source, the symbol $F_t$ denotes tractive force of the linear induction motor, and the symbols $F_1$ and $F_2$ denote forces developed by the linear induction motor in the first direction. The coils 5 (FIG. 1) of the polyphase concentrated winding 4 in each row extended in the second direction have a forward rotation of the phases A (FIG. 2), B and C.

The coils 5 (FIG. 1) of the polyphase concentrated winding 4 in each row extended in the first direction have a forward rotation of the phases A (FIG. 2), B and C up to the middle of a respective row and a reverse rotation of the phases A, B and C thereafter.

The linear induction motor according to the present invention operates as follows. To enable movement of the inductor 1 (FIG. 1) along the arrow D, the three-phase concentrated winding 4 of the inductor 1 is connected to the three-phase power source, the phases A (FIG. 2), B and C thereof being appropriately distributed among the coils 5 (FIG. 1) of the three-phase concentrated winding 4. Magnetic fields set up by the entire system of the coils constituting the polyphase concentrated winding 4 of the inductor 1 travel in the opposite sense to movement of the inductor 1. Opposite magnetic fields are also set up by the coils 5 in each row extended in the first direction.

The travelling magnetic fields cross the electrically conductive part 7 of the secondary element 6 and induce therein electromotive forces causing in the electrically conductive part 7 the flow of eddy currents which interact with the magnetic fields of the inductor 1 of the linear induction motor. The magnetic fields travelling in the opposite sense to movement of the inductor 1 interact with the currents flowing through the electrically conductive part 7 of the secondary element 6 to give rise to tractive forces $F_t$ (FIG. 2) acting in the second direction and levitation forces of the linear induction motor. The opposite magnetic fields interact with the currents flowing through the electrically conductive part 7 (FIG. 1) of the secondary element 6 to give rise to opposite forces $F_1$ (FIG. 2) and $F_2$ which balance one another and exert no effect upon the operation of the linear induction motor in the absence of lateral disturbances acting on the inductor 1 (FIG. 1).

If the inductor 1 moves in the first direction under the action of incidental lateral disturbances such, for example, as a cross wind, the balance of the forces $F_1$ (FIG. 2) and $F_2$ will be upset since a portion of the inductor 1 (FIG. 1) is displaced beyond the secondary element 6 whereby the inductor 1 (FIG. 1) of the linear induction motor will be returned to the original position, i.e., self-stabilized under the action of a stabilizing force equal to the difference between the forces $F_1$ (FIG. 2) and $F_2$. The magnitude of the stabilizing force is proportional to that of the lateral disturbance force.

The present invention permits lateral stabilization of an inductor with respect to a secondary element of a linear induction motor.

What is claimed is:

1. A linear induction motor comprising:
an inductor;
a magnetic core structure of said inductor;
a polyphase concentrated winding of said inductor;
coils of said polyphase concentrated winding of said inductor arranged in a plurality of rows;
first-group laminations of said magnetic core structure of said inductor extended in one direction;
rods of each of said first-group laminations of said magnetic core structure of said inductor;
each of said first-group laminations having at least four slots adapted to receive said coils of said polyphase concentrated winding of said inductor;
second-group laminations of said magnetic core structure of said inductor extended in another direction transversely of the first direction; rods of each of said second-group laminations of said magnetic core structure of said inductor;
each of said second-group laminations of said magnetic core structure of said inductor having an inverted U-shape configuration;
the number of said second-group laminations between each pair of adjacent first-group laminations of said magnetic core structure of said inductor exceeding by one piece the number of the slots in said first-group laminations of said magnetic core structure of said inductor;
said first-group laminations of said magnetic core structure of said inductor interconnected by means of said second-group laminations of said magnetic core structure of said indicator;
each said coil of said polyphase concentrated winding of said inductor encompassing one of said rods of at least one of said first-group laminations and one of said rods of at least one of said second-group laminations;

said coils of said polyphase concentrated winding of said inductor in each said row extended in the first direction having a forward phase rotation up to the middle of each said row and a reverse phase rotation thereafter;

said coils of said polyphase concentrated winding of said inductor in each said row extended in the second direction having a forward phase rotation;

a secondary element;

a magnetically conductive base of said secondary element;

an electrically conductive part of said secondary element arranged on said magnetically conductive base of said secondary element.

2. A linear induction motor as claimed in claim 1, wherein the extreme first-group laminations are made to a dimension, as measured in the second direction, which exceeds a similar dimension of each of the other first-group laminations by an amount corresponding to the dimension of said rod of said second-group lamination, as measured in said direction.

* * * * *